J. N. BREWSTER.
AUTOTRUCK BODY.
APPLICATION FILED SEPT. 10, 1912.
1,063,115.
Patented May 27, 1913.
3 SHEETS—SHEET 1.
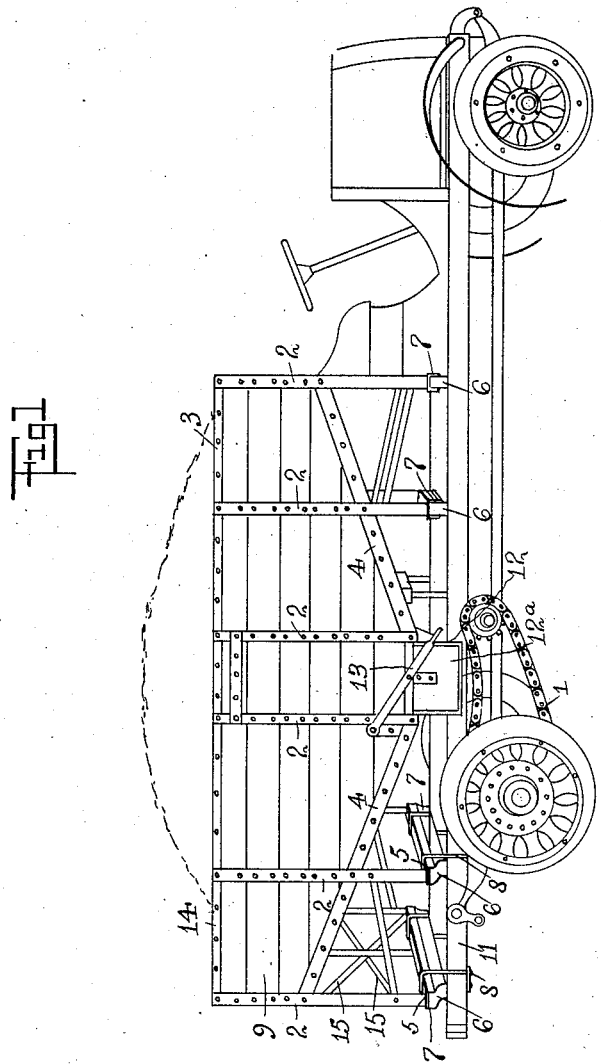
WITNESSES
INVENTOR
James N. Brewster,
BY
ATTORNEYS

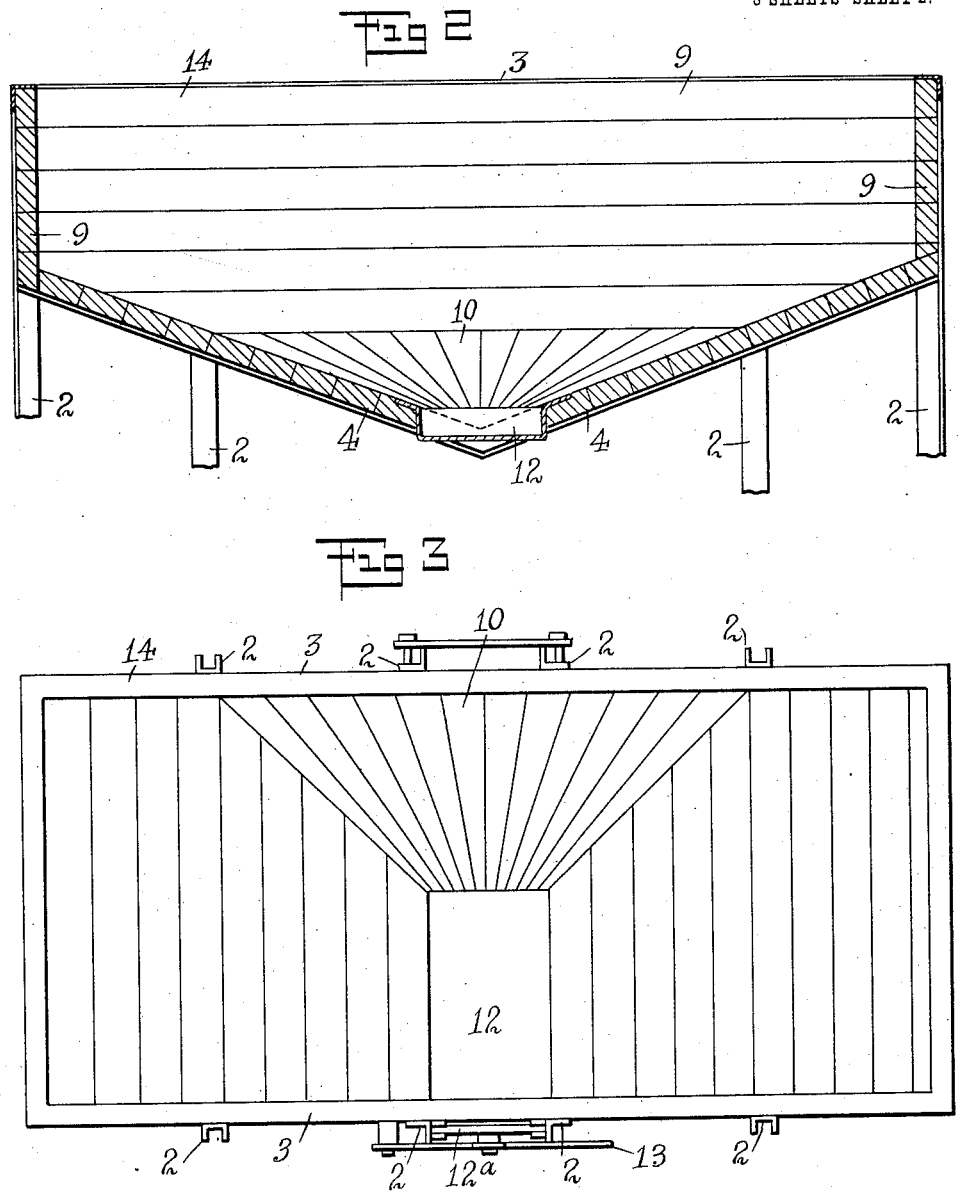

J. N. BREWSTER.
AUTOTRUCK BODY.
APPLICATION FILED SEPT. 10, 1912.
1,063,115.
Patented May 27, 1913.
3 SHEETS—SHEET 3.
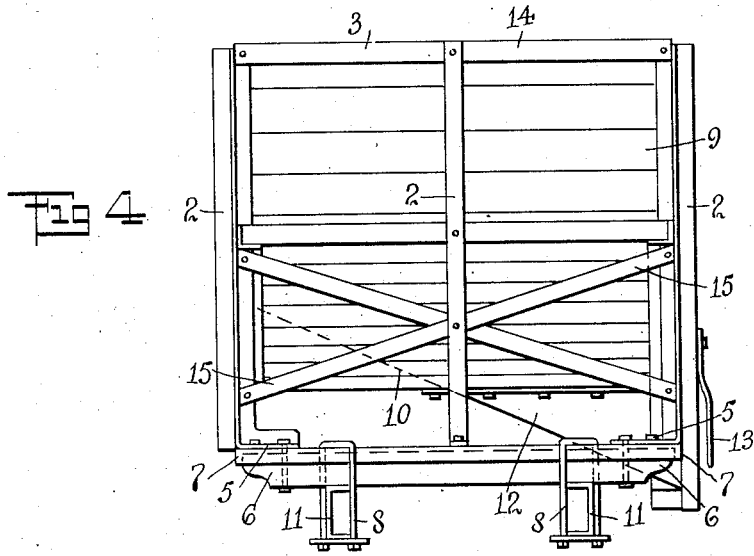
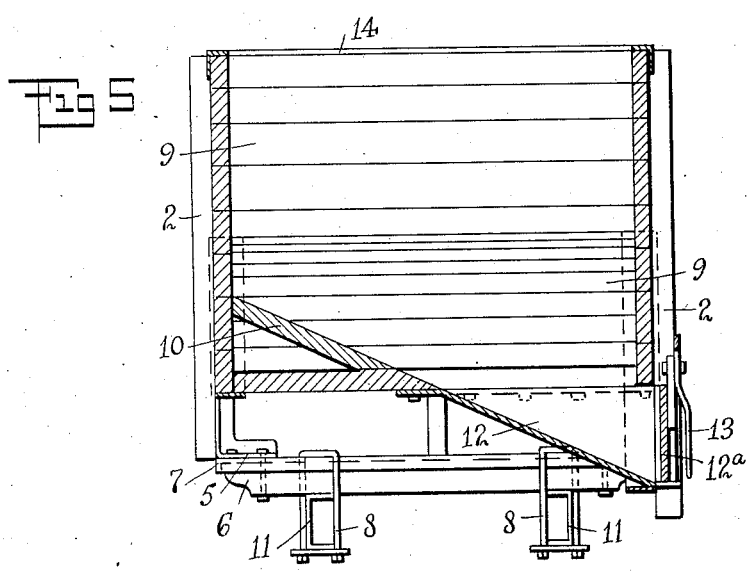
WITNESSES
INVENTOR
James N. Brewster,
BY
ATTORNEYS

UNITED STATES PATENT OFFICE.

JAMES N. BREWSTER, OF NEW YORK, N. Y.

AUTOTRUCK-BODY.

1,063,115.  Specification of Letters Patent.  Patented May 27, 1913.

Application filed September 10, 1912. Serial No. 719,513.

*To all whom it may concern:*

Be it known that I, JAMES N. BREWSTER, a citizen of the United States, and a resident of the city of New York, Coney Island, borough of Brooklyn, in the county of Kings and State of New York, have invented new and useful Improvements in Autotruck-Bodies, of which the following is a full, clear, and exact description.

My invention relates to cart or wagon bodies and comprises a construction especially adapted for use in coal cart bodies for auto trucks. In structures of this kind it is essential that they be light in weight, strong, and shall afford as free access as possible to the machinery of the chassis carrying the body.

I have invented a construction of this character, the best form of which at present known to me is illustrated in the accompanying three sheets of drawings, in which, Figure 1 is a perspective side view of an auto truck equipped with a body of my invention; Fig. 2 is a vertical central section of the body; Fig. 3 is a plan view; Fig. 4 is a rear elevation; and Fig. 5 is a vertical central cross section.

Throughout the drawings like reference characters indicate like parts.

1 indicates the running gear and 11 the chassis of an auto truck. The truck body 14 is composed of an open angle iron framework having upright angle irons 2, 2, a top angle iron 3, and the inclined angle irons 4, 4, extending from near the middle portion of body upward to the front and rear ends. The lower ends of the upright angle irons are bent inward to form feet 5, 5, and are bolted to cross sills 6, 6, on which are laid channel irons 7, 7, the cross sills and channel irons being clamped to the chassis 11, by clips 8, 8. To the inside of the frame so formed are bolted planks 9, 9, forming the floor and sides of the body. A side incline is shown at 10, delivering all the contents of the body to the discharge chute 12, the mouth of which is controlled by a sliding door 12ª, operated by lever 13.

15, 15 are diagonal braces extending between the angle irons 2, 2, below the floor at the ends.

The above construction produces a particularly light and strong body, which also affords ready access to the transmission mechanism of the auto truck.

Having, therefore, described my invention, I claim:

1. An auto-truck body composed of an open frame-work of angle iron, a series of cross sills of timber to which the lower ends of the upright angle irons are bolted, inclined floor angle irons extending from the middle portion upward to the front and rear ends, and sides and flooring of wooden planks bolted to the inside of said angle iron framework extending from the said inclined floor angle irons upward, but leaving the lower portion of the angle iron framework exposed in skeleton form.

2. An auto-truck body, composed of an open framework of angle iron, a series of cross sills of timber to which the lower ends of the upright angle irons are bolted, inclined floor angle irons extending from the middle portion upward to the front and rear ends, and sides and flooring of wooden planks bolted to the inside of said angle iron framework, channel bars laid on said cross sills, and clips adapted to clamp them to the chassis of the truck.

In testimony whereof I have signed my name to this specification in the presence of two subscribing witnesses.

JAMES N. BREWSTER.

Witnesses:
 THEO. G. HOSTER,
 PHILIP D. ROLLHAUS.

---

Copies of this patent may be obtained for five cents each, by addressing the "Commissioner of Patents, Washington, D. C."